Nov. 30, 1937. A. N. SPÁNEL 2,100,578
FORM FOR MAKING GARMENTS
Filed March 30, 1936 5 Sheets-Sheet 1
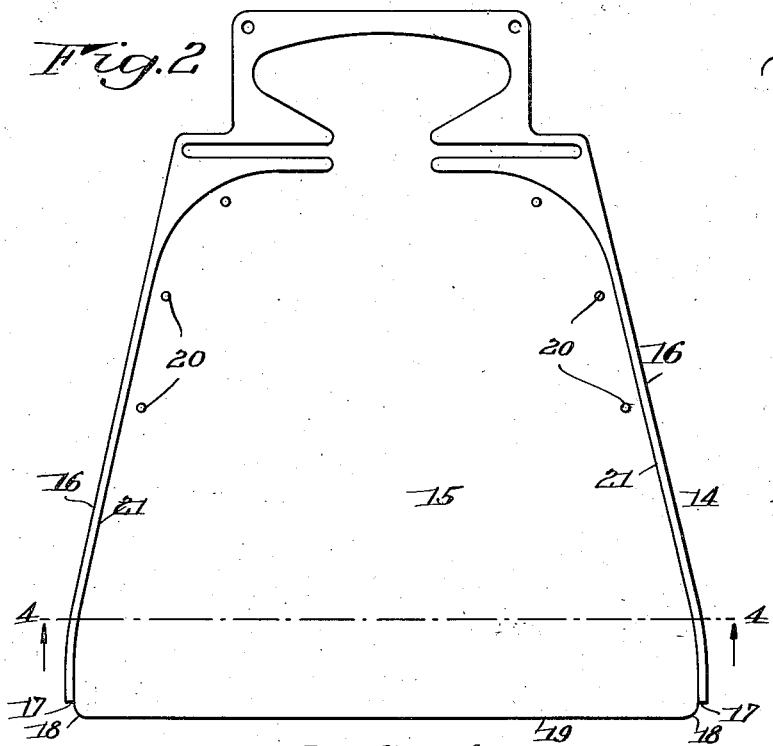
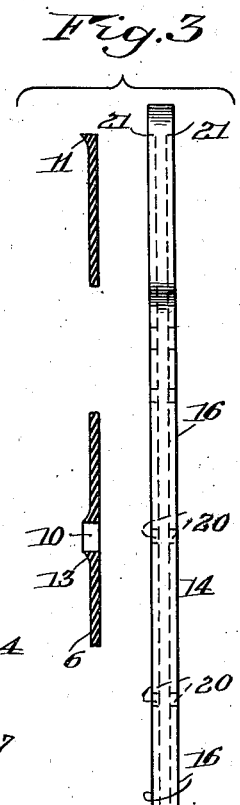
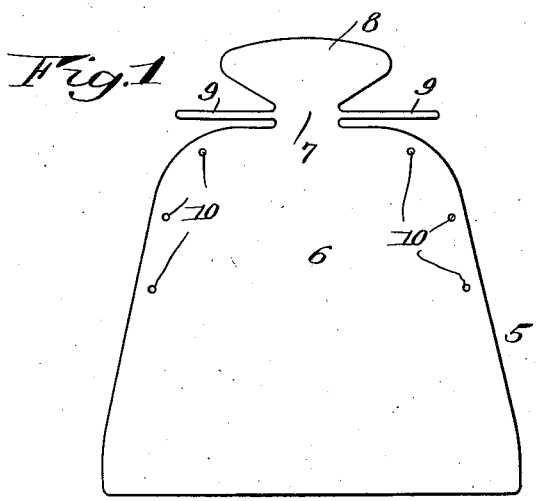
INVENTOR.
Abraham N. Spánel
BY D. Clyde Jones
his ATTORNEY.

Nov. 30, 1937.  A. N. SPÁNEL  2,100,578
FORM FOR MAKING GARMENTS
Filed March 30, 1936    5 Sheets-Sheet 2
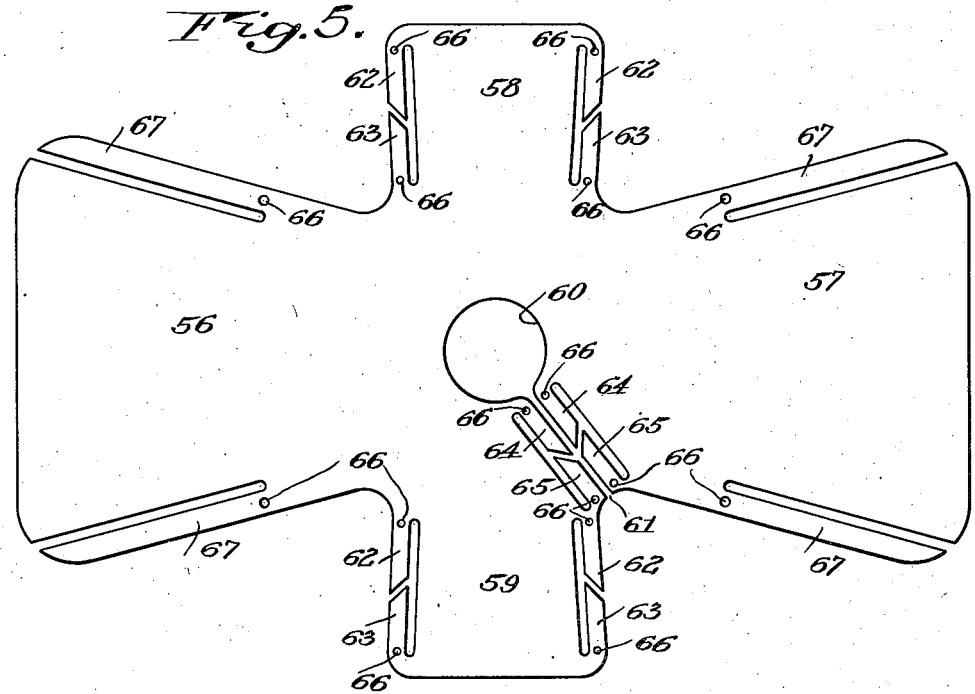
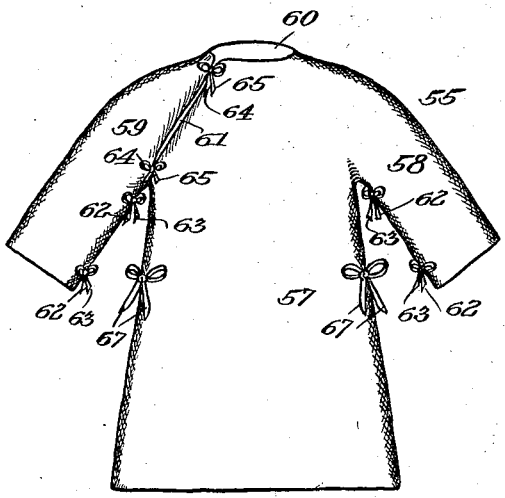
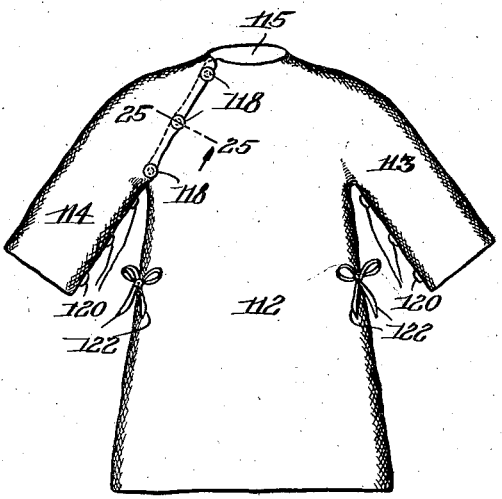
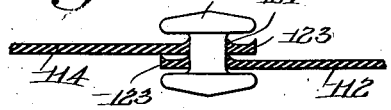
INVENTOR.
Abraham N. Spanel
BY D. Clyde Jones
his ATTORNEY.

Nov. 30, 1937. A. N. SPÁNEL 2,100,578
FORM FOR MAKING GARMENTS
Filed March 30, 1936   5 Sheets-Sheet 3
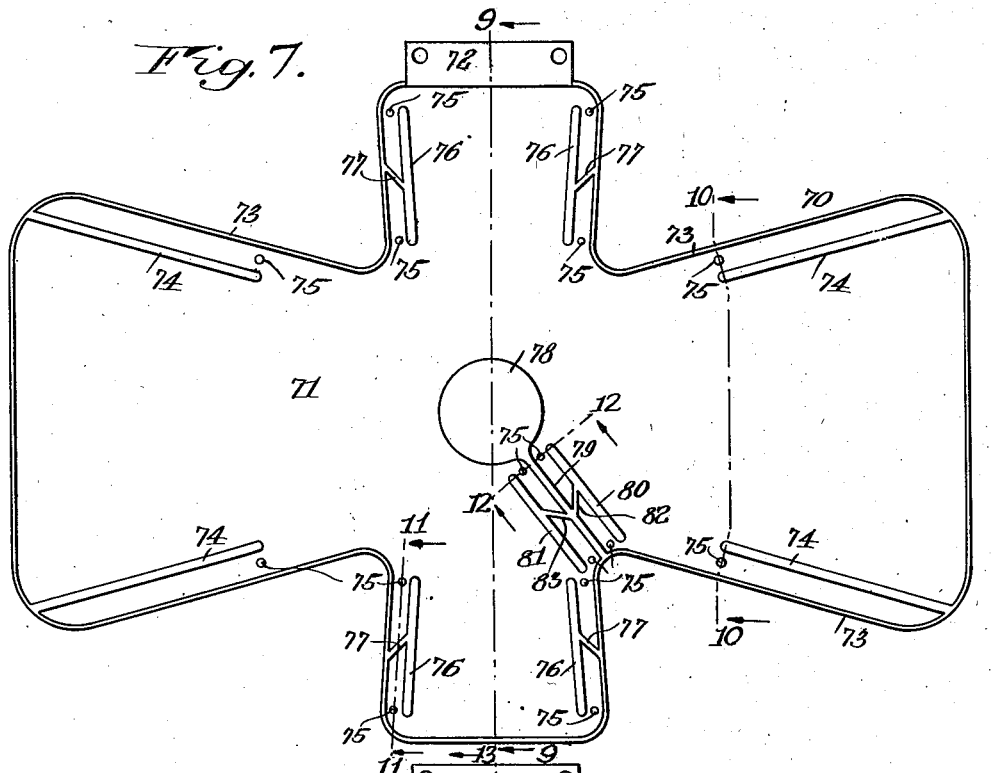
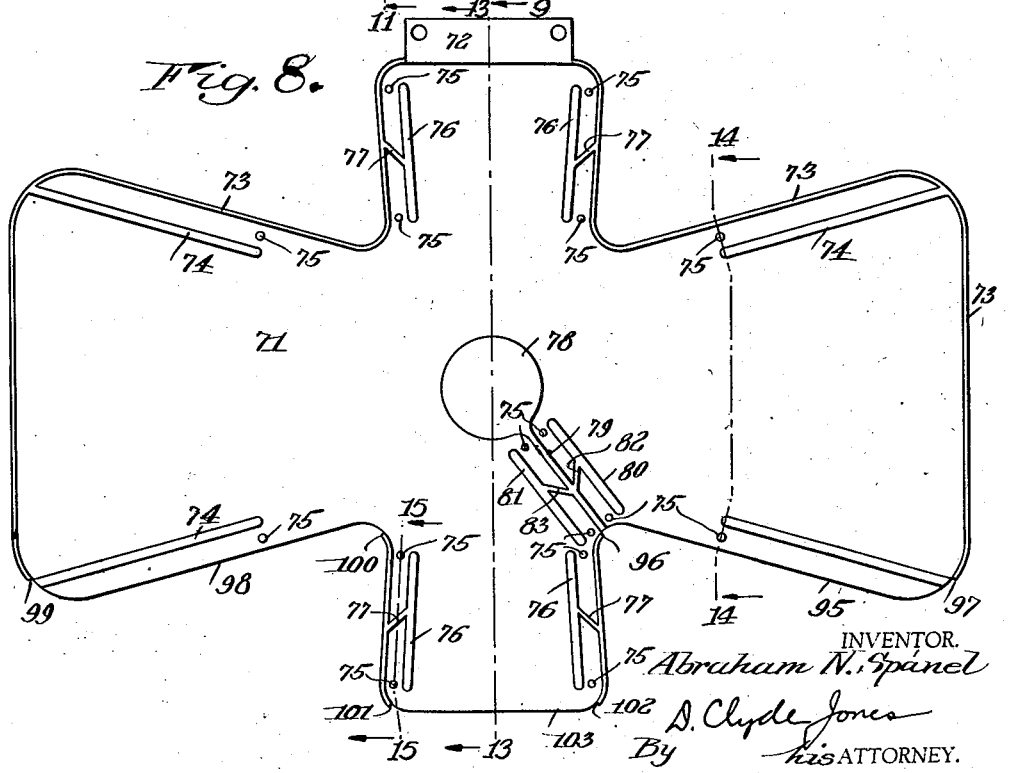

Nov. 30, 1937. A. N. SPÁNEL 2,100,578
FORM FOR MAKING GARMENTS
Filed March 30, 1936 5 Sheets-Sheet 4
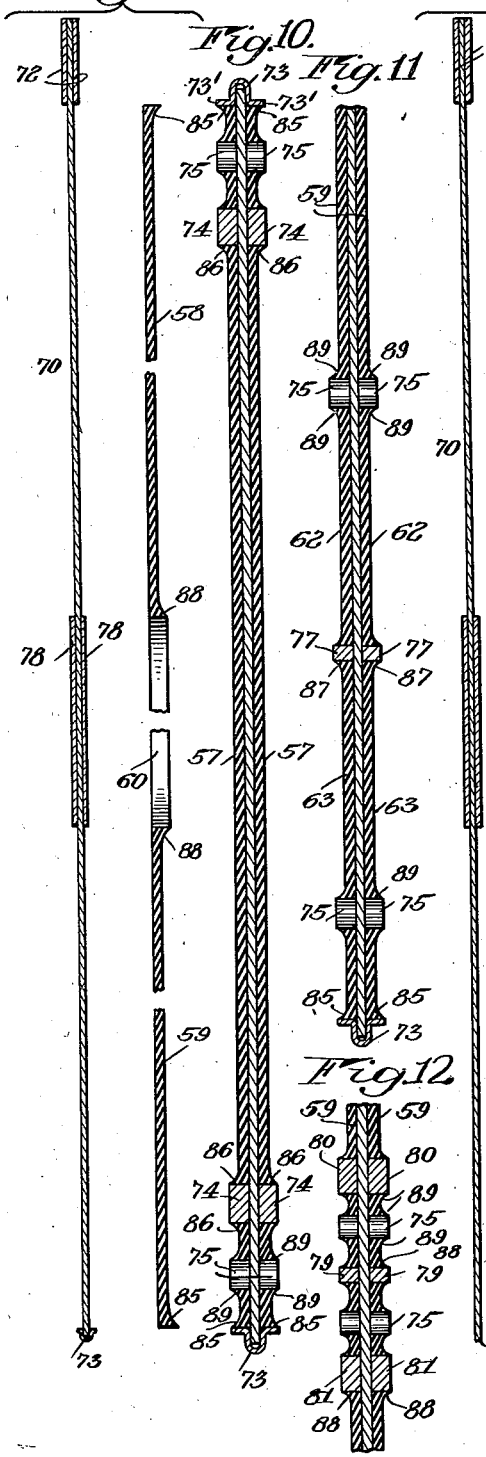
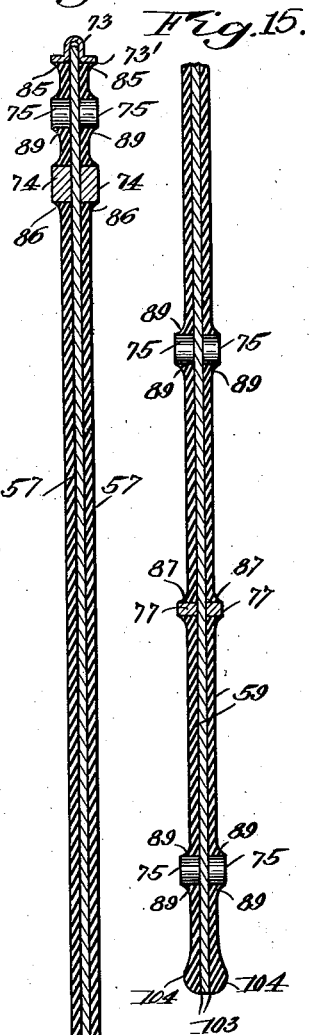
INVENTOR.
Abraham N. Spánel
BY D. Clyde Jones
his ATTORNEY.

Patented Nov. 30, 1937

2,100,578

UNITED STATES PATENT OFFICE 2,100,578

FORM FOR MAKING GARMENTS

Abraham N. Spánel, Rochester, N. Y.

Application March 30, 1936, Serial No. 71,661

9 Claims. (Cl. 18—41)

This invention relates to forms for making deposited latex garments.

This application is a continuation in part of applicant's copending applications, Serial No. 740,141 filed August 16, 1934, and Serial No. 55,214 filed December 19, 1935.

Prior garments of this type have been made from pieces of sheet rubber joined together by cement leaving seams in the finished product. Such seams have rendered the garment bulky and have been a frequent source of failure. Where the garment was provided with rubber ties, the margins of the ties were reinforced by strips of rubber cemented thereto or by folding the margin on itself and cementing the overlapping parts together. The operations of cementing the reinforcing parts together have been expensive and the resulting product has frequently been unattractive.

A feature of the invention, relates to a fashioned, seamless, deposited latex garment.

A further feature relates to a seamless latex garment having its marginal edges reinforced by integral ridges of latex.

Another feature relates to a seamless latex garment having latex ties integral therewith.

An additional feature relates to a flat seamless latex blank which can be finished into a dress or the like.

The main feature of the invention relates to novel forms on which the garments of the present invention can be deposited with a minimum amount of labor and with a minimum amount of waste material.

Figure 19:
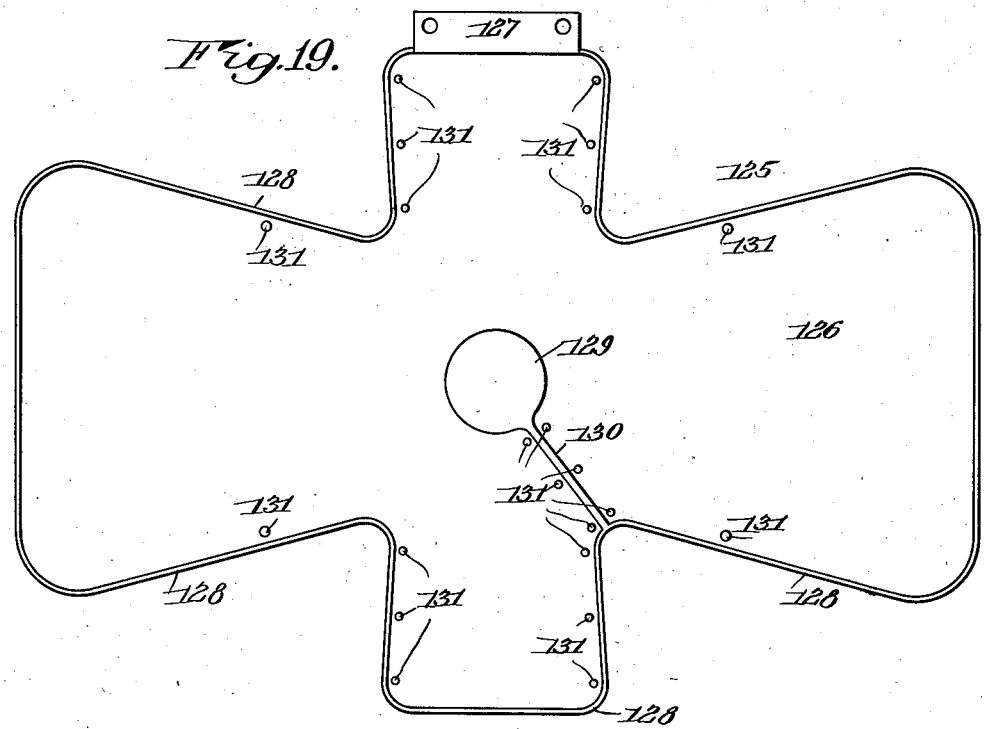
Figure 16:
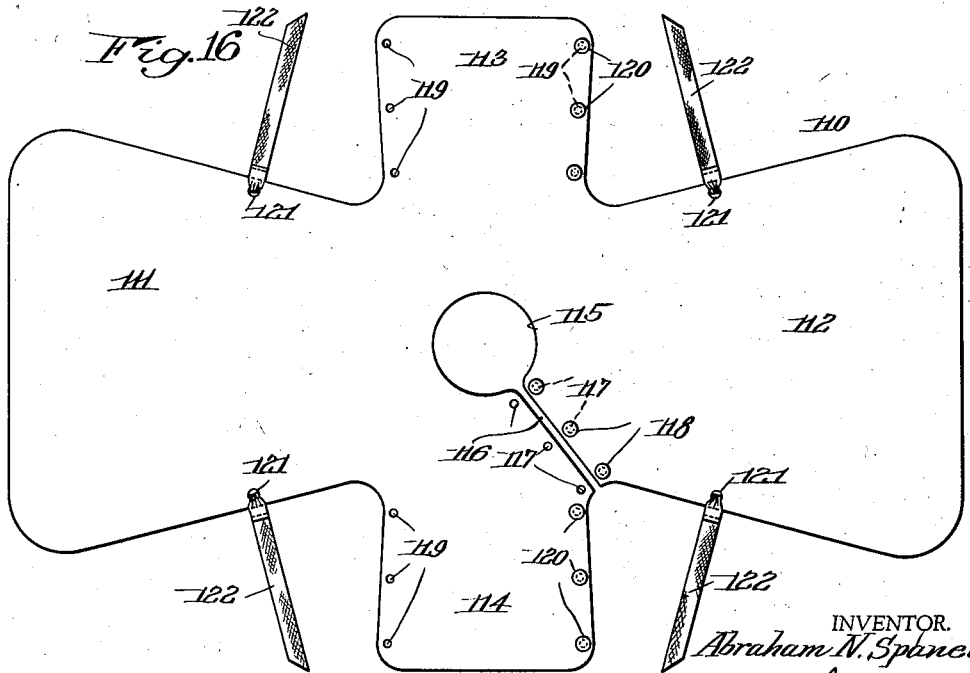

The various features and advantages of the invention will appear from the detailed description of claims when taken with the drawings, in which Fig. 1 is a front elevation of a cape made in accordance with the invention; Fig. 2 is a front elevation of a form on which the cape of Fig. 1 can be deposited; Fig. 3 is a side elevation of this form with enlarged fragments of the latex cape, slightly displaced from the position in which they are deposited on the form; Fig. 4 is a cross section of this form taken substantially on the line 4—4 of Fig. 2; Fig. 5 is a plan view of a blank for making an easily fashioned latex garment or dress; Fig. 6 is a front elevation of a finished dress made from the blank of Fig. 5; Figs. 7 and 8 illustrate two different types of forms on which the dress of Figs. 5 and 6 can be deposited; Fig. 9 is a section taken on the line 9—9 of Fig. 7, also indicating an enlarged fragmentary sectional view of a layer of latex shown slightly displaced from the position in which it is deposited on the form; Fig. 10 is a sectional view taken on the line 10—10 of Fig. 7 and having on each surface thereof a layer of latex in the position in which it is deposited on the form; Fig. 11 is a sectional view taken on the line 11—11 of Fig. 7, also having thereon a layer of latex deposited on each of its surfaces; Fig. 12 is a section taken on the line 12—12 of Fig. 7, indicating the character of reinforcements deposited on certain portions of the form; Fig. 13 is a section of the form taken on the line 13—13 of Fig. 8, also showing in slightly displaced relation therefrom an enlarged section of the latex layer deposited on one surface of the form; Fig. 14 is a sectional view taken on the line 14—14 of Fig. 8, also having on each of its surfaces a layer of latex in the position in which the latex is deposited on the form; Fig. 15 is a sectional view taken on the line 15—15 of Fig. 8, also illustrating the character of the latex layer and the marginal reinforcements therefore deposited on each surface of the form; Fig. 16 is a plan view of a modified latex dress before it has been fashioned; Fig. 17 is a front view of this dress after it has been fashioned; Fig. 18 is a section taken on the line 18—18 of Fig. 17 illustrating especially the reinforcements of the margins of the dress, and the material at the margins of the buttonholes therein; and Fig. 19 is a plan view of a form on which the dress of Fig. 18 can be deposited.

Referring especially to Fig. 1, 5 designates a latex cape having a body portion 6, a neck portion 7, and a collar portion 8. Integral strings 9 project outwardly from the cape at the collar portion and serve as ties for fastening the collar portion in closed condition. Each side margin of the cape, adjacent the shoulder portion thereof, is provided with button-holes or openings 10, to receive suitable buttons or fastening means whereby the side margins of the cape can be fastened together. The entire margin of the cape and collar, as well as the margins of the ties 9, are reinforced by integral ridges of latex as indicated at 11 and 12 (Fig. 3). Also the margin of the cape at each of the button-holes 10, is reinforced as indicated at 13 in Fig. 3.

The cape of Fig. 1 is preferably made on the metal form 14 of Figs. 2 and 3. Each surface of this form is made with a panel 15, the side and top portions of which are defined by a raised border 16. It will be understood that the inner edges of the raised border have the outline of the desired shape of the upper portion of the cape. It will be noted that the raised border 16 terminates a short distance from the bottom of the form as indicated at 17, so that the curved corners 18 and the lower edge 19 of each panel terminate in abrupt edges in the planes of the panels. A series of bosses 20, which terminate in abrupt edges, project from each panel near the margins of the shoulder positions thereof to generate button-holes in the capes deposited on the form.

In making the capes 5, latex is deposited on the form 14, preferably by dipping the form vertically into latex bath in the position illustrated, one or more times, with a drying interval between each dip. It will be understood that the latex will accumulate as a layer of uniform thickness on each panel 15 of the form. However, in the junction between each panel and the raised border 16 the latex will accumulate as a triangular ridge 11, while at the abrupt edges 21 of the raised border a line of weakness will develop in the deposited layer so that the excess portion of the layer on the face of the border can be stripped away as far as the abrupt edges. Similarly, in the junction between each panel and each of the raised bosses 20, which develop the button-holes in the cape, the latex will accumulate as a generally triangular ridge 13, (Fig. 3). However, at the abrupt edge of each boss, there will be a line of weakness in the layer of latex so that the portion of the layer on the exposed end of each boss can be removed, leaving the button-holes 10 in the finished cape. Above the abrupt edge at the rounded corner 18 and above the lower edge 19 of each panel, the latex layer will accumulate as a ridge 12, generally semi-pear shaped or semi-oval in cross section, with a line of weakness in the layer at the abrupt edge. After the latex layer has proper "set", the excess portions thereof on the exposed faces of the raised border 16 and the bosses 20, are removed and the cape on each panel of the form can be stripped therefrom and suitably treated for the trade.

The dress 55, illustrated in Figs. 5 and 6 which is made from a single piece or blank having the outline indicated in Fig. 5, has a shape similar to a distorted cross, including parts 56 and 57 which cover the body of the wearer and two sleeve-forming parts 58 and 59. At the junction of these several parts there is provided a circular neck opening 60 connected by a slit 61 to one margin of the garment. Each side of each of the sleeve-forming portions 58 and 59, is provided with a pair of tie strings 62 and 63 having their free ends opposing each other. Each margin of the garment at each side of the slit 61, is also provided with a pair of tie strings 64 and 65 also having their free ends opposing each other. In addition at each side of each of the body-forming portions, there is provided a tie string 67. It will be noted that adjacent the junction of each of the tie strings with the body of the garment, there is provided an opening 66, through which the free end of the related strings can be inserted. All of the edges of the garment, including all of the edges of the tie strings and the margin of the latex at each opening 66, are reinforced by ridges of latex integral with the latex of the garment, as will be hereinafter set forth. The blank of Fig. 5 can be fashioned into a garment as illustrated in Fig. 6 by tying certain of the strings together as will be obvious from Fig. 6.

The garment blank illustrated in Fig. 5 can be made on a form 70, illustrated in Fig. 7. This form comprises a panel 71 of sheet material such as commercial sheet steel or aluminum, cut to the outline of the desired garment, in this instance approximating a modified four-leaf clover design. The upper portion of the panel 71 has attached to the opposite surfaces thereof plates 72 having openings therein by which the form can be supported while latex is being deposited thereon. The remainder of the edge of this form is provided with a raised border 73 (see Fig. 10). This border comprises a metal strip having a groove rolled therein to receive the edge of the panel comprising the form proper. The edges of the border 73 which terminate abruptly at 73', project substantially at right angles from the plane of the form to a distance approximately equal to that of the thickness of the desired reinforced margin of the garment deposited on the form. The junctions between the border 73 and the panel are closed by welding and/or soldering so that there is no broken, or uneven seam at the junction between these parts. The tie strings 67 are generated on the form between a portion of the border 73 and the raised metal strip 74 of approximately the same thickness as the projection of the border 73 beyond the panel. The strip 74 terminates in an abrupt edge. Adjacent the free end of this strip there is provided a raised circular metal boss 75 terminating an abrupt edge to develop an opening 66 in the resulting garment.

The portions on the sleeve section of the form for developing the ties 62 and 63 comprise metal strips 76 spaced from the adjacent portion of the border 73 but connected thereto by metal diagonal connecting pieces 77. The pieces 76 and 77 are attached to the face of the panel and project therefrom a distance approximately equal to the projection of the border 73. The junctions between the strips 76 and diagonal pieces 77, and the face of the panel as well as the junction between the ends of the diagonal strips 77 and the border 73 are filled with solder or like material so that there is no uneven seam between these parts. The pieces 76 and 77, as well as the border 73, terminate in abrupt edges for a purpose to be set forth. A circular metal boss 75 which terminates in an abrupt edge, is secured to each face of the panel adjacent each end of each strip 76. On each surface of the form, near the geometric center thereof, there is provided a circular metal plate 78 which is connected by a strip 79 to the border 73. The plate 78 and the strip 79 are provided with abrupt edges. At each side of the strip 79 there are secured on each face of the form, parallel metal strips 80 and 81, these strips being connected by diagonal strips 82 and 83 with the strip 79. These several strips and plates 78 are soldered or otherwise attached to the face of the form so that no broken or uneven seams are present at the junction between the several parts.

In making garments on this form, the form is supported by the plate 72 so that latex can be deposited thereon. Preferably the form is dipped into a latex bath one or more times until a layer of latex of the desired thickness is deposited on each face of the form. During the dipping and draining operations the latex will accumulate in the junction between each surface of the panel and the border 73 as reinforcements 85 (see Figs. 9, 10 and 11). At the abrupt edges 73' of the border a line of weakness will develop in the layer. Similarly in the junction between the strips 74 and the panel the latex will accumulate as a ridge or reinforcement 86. Similarly in the junction between the strip 76 and the diagonal connecting piece 77 the latex will accumulate as a ridge or reinforcement 87. Similarly in the junction between the circular plate 78 as well as the strips 79 and 81 with the panel, the latex will accumulate as a ridge or reinforcement 88. Also in the junctions between the circular bosses 75 and the panel, latex will accumulate as a ridge or reinforcement 89. However, at the abrupt edges of the strips, plates and bosses, a line of weakness will develop in the deposited layer. After the deposited latex layer has properly "dried" the excess portions of the layer on the border on the faces of the several strips, plates and bosses are torn away as far as the line of weakness in the layer developed by the abrupt edges of these parts. When the excess portions of the layer are thus stripped away, the resulting garment on each face of the panel is removed and treated in accordance with the usual practice to prepare for the market.

The garment blank illustrated in Fig. 5 can also be deposited on the form illustrated in Fig. 8. This form is similar to that just described and identical parts are identified by the same reference characters. This last mentioned form differs from that just described in that portions of the border 73 are omitted from the lowermost horizontal portions of the form; that is, the border is omitted between the points designated 96 and 97 so that this portion of the form terminates in abrupt edges 95 in the planes of the surfaces of the panel. Similarly the border is omitted between the points designated 99 and 100 so that the panel terminates in abrupt edges 98 in the planes of the surfaces of the panel. Also between the points 101 and 102 the border is omitted so that this portion of the form terminates in abrupt edges 103 in the planes of the surfaces of the panel.
The garment deposited on this form is similar to that already described except that the marginal reinforcements deposited at the abrupt edges 95, 98 and 103 are semi-pear shaped or semi-oval in cross section as illustrated at 104, in Figs. 13 and 15 at 105 in Fig. 14.

The method of making latex garments on this last mentioned form is identical with that previously described in connection with the making of the garment blank, Fig. 5, and need not be repeated. It should only be mentioned that at the abrupt edges 95, 98 and 103 on the form, lines of weakness will develop in the deposited layer so that the layer can be readily separated thereat, leaving reinforcements which are generally semi-pear shaped in cross section.

Instead of providing the garment with integral tie strings to assist in fastening the garment, it may be modified as illustrated in Fig. 16 by omitting the integral tie strings and providing openings in certain margins of the garment to receive suitable fastening means so that the garment can be fashioned as illustrated in Fig. 17. The garment blank 110 from which this garment is fashioned likewise has the shape of a distorted four-leaf clover, having the portions 111 and 112 which cover the body of the wearer and the portions 113 and 114 which form the sleeves. The geometric center of this blank is provided with a neck opening 115 which is connected by a diagonal slit 116 to one edge of the garment. A series of openings 117 is provided in the margins of the garment at each side of the slit 116. These openings are adapted to receive buttons or other suitable fastening means 118. Also there is provided in the margins at each side of the sleeve portions 113 and 114 a series of openings or buttonholes 119 adapted to receive suitable buttons or other fastening means 120. In the margin at each side of each body portion there is also provided an opening 121 through which one end of a tie or string 122 is inserted and fastened as by stitching. It will be understood that all of the margins of the garment, including the margins of the neck opening and slit 116 and the margins of the several buttonholes or openings, are reinforced by integral ridges of rubber as best illustrated at 123 and 124 in Fig. 18.

This garment blank can be made on the form 125 of Fig. 19 which comprises a panel 126 of commercial sheet steel or aluminum cut to the desired outline of the desired garment. The border of the panel is provided with a supporting plate 127 similar to the supporting plate 72 (Fig. 7). The remainder of the margin of the panel is provided with a raised border 128 similar to the border 73 in Fig. 7. A circular neck plate 129 connected by a strip 130 to the border is fastened on each surface of the panel, also at certain portions of the panel raised circular bosses 131 are secured to generate the desired buttonhole openings in the resulting garment. The plates 129, strips 130 and bosses 131 terminate in abrupt edges as already described.

The several operations of depositing a garment on this form need not be repeated since they will be obvious from the foregoing description.

The procedure of manufacture may utilize precured liquid latex, compounded latex or uncompounded latex. The deposition may be carried out by straight dipping, by acid coagulation or by spraying.

The present disclosure is given merely by way of example and it will be understood that there can be many modifications and variations thereof within the scope of the appended claims without departing from the spirit of the present invention.

What I claim is:

1. A form on which latex articles can be deposited, said form comprising a panel having a central shoulder-generating part and body-generating portions and sleeve-generating portions extending from said part, and means on said panel for generating a neck opening in the resulting garment, the margin of said panel terminating in an abrupt edge.

2. A form on which latex articles can be deposited, said form comprising a panel having a central shoulder-generating part and body-generating portions and sleeve-generating portions projecting from said part, a raised strip attached to each marginal side of each portion in spaced relation to the edge thereof, and means on said panel for generating a neck opening in the resulting garment.

3. A form on which latex articles can be deposited, said form comprising a panel having a central shoulder-generating part and body-generating portions and sleeve-generating portions projecting from said part, a raised strip attached to each marginal side of each portion in spaced relation to the edge thereof, raised connecting pieces attached to said panel and each joining certain of said strips to an adjacent margin of the panel, and means on said panel for generating a neck opening in the resulting garment.

4. A form on which latex articles can be deposited, said form comprising a panel having a central shoulder-generating part and body-generating portions and sleeve-generating portions projecting from said part, a raised strip attached along each marginal side of each portion in spaced relation to the edge thereof, a raised boss on said panel adjacent an end of each strip, and means on said panel for generating a neck opening in the resulting garment.

5. A form on which latex articles can be deposited, said form comprising a panel having a main shoulder-generating part and a body-generating portion and sleeve-generating portions projecting from said part, and a raised plate attached to said part.

6. A form on which latex articles can be deposited, said form comprising a panel having a central shoulder-generating part and body-generating portions and sleeve-generating portions projecting from said part, a raised plate attached to said part, and a raised strip attached to said panel connecting said plate to a margin of said panel.

7. A form on which latex articles can be deposited, said form comprising a panel having a central shoulder-generating part and body-generating portions and sleeve-generating portions projecting from said part, a raised plate attached to said part, a raised narrow strip attached to said panel and connecting said plate to a margin of said panel, and a raised strip attached to said panel at each side of said narrow strip and connected to said narrow strip by a raised connecting piece.

8. A form on which latex articles can be deposited, said form comprising a panel having a central shoulder-generating part and body-generating portions and sleeve-generating portions projecting from said part, a raised plate attached to said part, a raised narrow strip attached to said panel and connecting said plate to a margin of said panel, a raised strip attached to said panel at each side of said narrow strip and connected to said narrow strip by a raised connecting piece, and a raised boss adjacent an end of each of said last mentioned strips.

9. A form for making a substantially flat rubber article by depositing latex or the like thereon, said form comprising a panel having an article-generating surface thereon, the outline of said surface being defined mainly by reinforcement-generating means, at least a portion of said means comprising raised sections of the panel, said panel being provided with raised sections within the limits of the article-generating surface and adjacent said reinforcement-generating means, to define integrally reinforced securing means in the resulting garment.

ABRAHAM N. SPÁNEL.